(12) United States Patent
Tholath (10) Patent No.: US 10,559,103 B2
(45) Date of Patent: Feb. 11, 2020

(54) GENERATION OF GEOMETRY OF OBJECTS (71) Applicant: AMADA HOLDINGS CO., LTD., Kanagawa (JP)

(72) Inventor: Jackson Tholath, Chennai (IN)

(73) Assignee: AMADA HOLDINGS CO., LTD., Kanagawa (JP)

(*) Notice: Subject to any disclaimer, the term of this patent is extended or adjusted under 35 U.S.C. 154(b) by 0 days.

(21) Appl. No.: 15/577,545

(22) PCT Filed: Jun. 8, 2016

(86) PCT No.: PCT/JP2016/002778
§ 371 (c)(1),
(2) Date: Nov. 28, 2017

(87) PCT Pub. No.: WO2016/199413
PCT Pub. Date: Dec. 15, 2016

(65) Prior Publication Data
US 2018/0165841 A1 Jun. 14, 2018

(30) Foreign Application Priority Data
Jun. 12, 2015 (IN) .......................... 2968/CHE/2015

(51) Int. Cl.
G06T 11/20 (2006.01)
G06T 3/60 (2006.01)
(Continued)

(52) U.S. Cl.
CPC .............. *G06T 11/203* (2013.01); *G06T 3/60* (2013.01); *G06F 3/04883* (2013.01); *G06F 17/50* (2013.01)

(58) Field of Classification Search
None
See application file for complete search history.

(56) References Cited

U.S. PATENT DOCUMENTS 5,371,845 A * 12/1994 Newell ............... G06F 3/04812
345/619
2003/0095701 A1* 5/2003 Shum ................. G06K 9/00221
382/155

(Continued)

FOREIGN PATENT DOCUMENTS

| JP | 2005-056209 | 3/2005 |
| JP | 2012-063938 | 3/2012 |

OTHER PUBLICATIONS

International Search Report (ISR) in International Pat. Appl. No. PCT/JP2016/002778, dated Jul. 12, 2016.

(Continued)

*Primary Examiner* — Jwalant Amin
(74) *Attorney, Agent, or Firm* — Greenblum & Bernstein, P.L.C.

(57) ABSTRACT

The present subject matter relates to generation of a geometry corresponding to a cross-sectional profile of an object. In an example method, a sketch corresponding to the cross-sectional profile of the object is received by a computing device. The sketch is drawn by moving a pointer over a display unit of the computing device. Pixel points generated by the display unit are obtained by the computing device. The pixel points correspond to the sketch. Low-speed pixel points, from amongst the pixel points, are joined with straight lines. The low-speed pixel points are the pixel points at which a speed of drawing of the sketch is below a predefined speed threshold. The straight lines are processed by the computing device into the geometry of the object.

7 Claims, 8 Drawing Sheets (51) Int. Cl.
G06F 17/50 (2006.01)
G06F 3/0488 (2013.01)

(56) References Cited

U.S. PATENT DOCUMENTS

| | | | |
|---|---|---|---|
| 2006/0089747 A1 | 4/2006 | Sakai | |
| 2006/0227140 A1* | 10/2006 | Ramani | G06K 9/00416 345/441 |
| 2007/0188518 A1* | 8/2007 | Vale | G06F 3/04883 345/619 |
| 2008/0282203 A1* | 11/2008 | Davis | G06Q 10/06 715/863 |
| 2008/0289553 A1* | 11/2008 | Yamada | D05B 19/08 112/470.04 |
| 2010/0079388 A1* | 4/2010 | Ohnishi | G06F 3/04845 345/173 |
| 2011/0160894 A1* | 6/2011 | Yamada | D05C 5/04 700/138 |
| 2012/0054177 A1* | 3/2012 | Wang | G06F 17/30277 707/723 |
| 2013/0262041 A1* | 10/2013 | Fu | G06F 17/50 703/1 |
| 2015/0022471 A1* | 1/2015 | Kwak | G06F 1/3265 345/173 |
| 2015/0301519 A1* | 10/2015 | Cooper | G06F 3/04842 700/98 |

OTHER PUBLICATIONS

Extended European Search Report dated Nov. 15, 2018 in European Patent Application No. 16807121.5.
James Herold et al: "SpeedSeg: A technique for segmenting pen strokes using pen speed", Computers and Graphics, Elsevier, GB, vol. 35, No. 2, Dec. 10, 2010, XP028164974, ISSN: 0097-8493.
Gabriel G. Johnson et al: "Sketch It, Make It: Freehand Drawing for Precise Rapid Fabrication", Jun. 1, 2014, XP055518942, Pittsburgh, PA 15213.
Takeo Igarashi et al: "Interactive beautification", International Conference on Computer Graphics and Interactive Techniques, ACM SIGGRAPH 2006 Papers, Boston, MA, ACM, New York, NY, USA, Jul. 30, 2006, XP058118901.
Olsen et al: "Sketch-based modeling: A survey", Computers and Graphics, Elsevier, GB, vol. 33, No. 1, Feb. 1, 2009, XP025911720, ISSN: 0097-8493.
Ferran Naya et al: "ParSketch: A Sketch-Based Interface for a 2D Parametric Geometry Editor", Jul. 22, 2007, Human-Computer Interaction. Interaction Platforms and Techniques: [Lecture Notes in Computer Science], Springer Berlin XP019062480, ISBN: 978-3-540-73106-1.
Yoshisuke Kurozumi et al: "Polygonal Approximation by the Minimax Method", Computer Graphics and Image Processing, US, vol. 19, No. 3, Jul. 1, 1982, XP001375206, ISSN: 0146-664X.

\* cited by examiner

GENERATION OF GEOMETRY OF OBJECTS

TECHNICAL FIELD

The present invention relates to generation of a geometry corresponding to a cross-sectional profile of an object.

BACKGROUND ART

Objects are generally designed and modeled using a computer before being engineered and manufactured in the industry. A geometry corresponding to a profile of the object to be manufactured is generated on the computer, and an input associated with the geometry of the object is provided to a manufacturing machine. The geometry of the object may be a 2-dimensional or a 3-dimensional model of the object. The manufacturing machine may accordingly process a raw material to manufacture the object.

Objects, such as sheet metal parts, are manufactured by bending and folding of metal sheets using a sheet bending machine. Before manufacturing such objects, the objects may be designed and modeled on a computer. In this, a user, for example a designer, may generate a geometry of object on the computer. The geometry of object may correspond to a cross-sectional profile of the object that depicts a bending pattern of the object. In an example, the geometry may be a 2-dimension (2D) model, or 3-dimension (3D) model, of the object which may help in determining a sequence of bending for manufacturing the object. After generating the geometry of the object, an input associated with the geometry of the object is fed to the sheet bending machine. The sheet bending machine may work on a raw material. i.e., a metal sheet, to bend and fold the metal sheet to form the object.

Geometry of objects are conventionally generating on the computer using modeling tools, such as computer-aided design (CAD). Conventional modeling tools are graphic-user-interface (GUI) based tools that provide a menu with tables and a large number of GUI elements, for example buttons, to a user for generating the geometry of the object. The user has to enter, in a table using the buttons, cross-sectional dimensions of the profile of the object. Based on the entered cross-sectional dimensions, the modeling tool generates the geometry of the object and displays it on a display unit of the computer.

The conventional modeling tools work based on progressive modeling where, at an instance of time, the user enters cross-sectional dimensions associated with a portion of the profile of the object, and the modeling tool generates and displays a geometry corresponding to that portion on the display unit. The user subsequently enters cross-sectional dimension for another portion of the profile of the object, and the modeling tool accordingly generates and displays a geometry corresponding to the other portion. In an example, for the objects like sheet metal parts that include multiple flanges, the user may enter cross-sectional dimensions for one flange at a time. The cross-sectional dimensions may, for example, include an inner flange length, an outer flange length, a bend angle, and a direction of bend. The conventional modeling tool progressively generates and displays the geometry of the sheet metal part, flange-by-flange.

The progressive modeling of the geometry of the object, i.e., based on portion-by-portion of the object as per the dimensions entered by the user, is tedious and time consuming, as the user may have to enter a large number of dimensions at each instance. The geometry of the object generated based on the dimensions entered initially may not correspond to the geometry intended by the user. Thus, the user may have to remodel the geometry by varying one or more of the dimensions, in order to generate the intended geometry of the object. Furthermore, as the user may have to utilize a large number of buttons in the menu for entering various dimensions of the object, the user may have to be an expert in using the conventional modeling tool.

SUMMARY OF INVENTION

It is therefore the object of the present invention to provide a generation of geometry corresponding to cross-sectional profiles of objects using a computing device, which is substantially fast, efficient, and less laborious, as the number of dimensions to be entered by a user and the manual intervention needed are much less in comparison to that for the conventional modeling tools and methodologies.

It is also the object of the present invention to provide a generation of geometry corresponding to cross-sectional profiles of objects using a computing device, in which geometry of objects can be generated by a user not having an expertise in generating geometry of objects.

According to one aspect of the present invention, there is provided a method for generating a geometry corresponding to a cross-sectional profile of an object, the method comprising: receiving a sketch, by a computing device (102), corresponding to the cross-sectional profile of the object, wherein the sketch is drawn by moving a pointer over a display unit (104) of the computing device (102); obtaining, by the computing device (102), pixel points generated by the display unit (104), wherein the pixel points correspond to the sketch; joining low-speed pixel points, from amongst the pixel points, with straight lines, wherein the low-speed pixel points are the pixel points at which a speed of drawing of the sketch is below a predefined speed threshold; and processing, by the computing device (102), the straight lines into the geometry of the object.

According to another aspect of the present invention, there is provided a computing device (102) for generating a geometry corresponding to a cross-sectional profile of an object, the computing device (102) comprising: a processor (108); and a geometry generating module (110) coupled to the processor (108) to: receive a sketch corresponding to the cross-sectional profile of the object, wherein the sketch is drawn by moving a pointer over a display unit (104) of the computing device (102); obtain pixel points generated by the display unit (104), wherein the pixel points correspond to the sketch; join low-speed pixel points, from amongst the pixel points, with straight lines, wherein the low-speed pixel points are the pixel points at which a speed of drawing of the sketch is below a predefined speed threshold; process the straight lines into the geometry of the object; and provide to a machine an input corresponding to the geometry of the object, for performing a work on a raw material by the machine in conformance with the geometry of the object.

According to another aspect of the present invention, there is provided a computer-readable medium storing a computer program for causing a computing device (102) to carry out the steps of: receiving a sketch corresponding to the cross-sectional profile of the object, wherein the sketch is drawn by moving a pointer over a display unit (104) of the computing device (102); obtaining pixel points generated by the display unit (104), wherein the pixel points correspond to the sketch; joining low-speed pixel points, from amongst the pixel points, with straight lines, wherein the low-speed pixel points are the pixel points at which a speed of drawing of the sketch is below a predefined speed threshold; and processing the straight lines into the geometry of the object.

BRIEF DESCRIPTION OF DRAWINGS

The following detailed description references the drawings, wherein.

DESCRIPTION OF EMBODIMENTS

Objects, such as sheet metal parts, are manufactured by bending and folding of metal sheets using a sheet bending machine. Before manufacturing such objects, the objects may be designed and modeled on a computer. In this, a user, for example a designer, may generate a geometry of object on the computer. The geometry of object may correspond to a cross-sectional profile of the object that depicts a bending pattern of the object. In an example, the geometry may be a 2-dimension (2D) model, or 3-dimension (3D) model, of the object which may help in determining a sequence of bending for manufacturing the object. After generating the geometry of the object, an input associated with the geometry of the object is fed to the sheet bending machine. The sheet bending machine may work on a raw material, i.e., a metal sheet, to bend and fold the metal sheet to form the object.

Geometry of objects are conventionally generating on the computer using modeling tools, such as computer-aided design (CAD). Conventional modeling tools are graphic-user-interface (GUI) based tools that provide a menu with tables and a large number of GUI elements, for example buttons, to a user for generating the geometry of the object. The user has to enter, in a table using the buttons, cross-sectional dimensions of the profile of the object. Based on the entered cross-sectional dimensions, the modeling tool generates the geometry of the object and displays it on a display unit of the computer.

The conventional modeling tools work based on progressive modeling where, at an instance of time, the user enters cross-sectional dimensions associated with a portion of the profile of the object, and the modeling tool generates and displays a geometry corresponding to that portion on the display unit. The user subsequently enters cross-sectional dimension for another portion of the profile of the object, and the modeling tool accordingly generates and displays a geometry corresponding to the other portion. In an example, for the objects like sheet metal parts that include multiple flanges, the user may enter cross-sectional dimensions for one flange at a time. The cross-sectional dimensions may, for example, include an inner flange length, an outer flange length, a bend angle, and a direction of bend. The conventional modeling tool progressively generates and displays the geometry of the sheet metal part, flange-by-flange.

The progressive modeling of the geometry of the object, i.e., based on portion-by-portion of the object as per the dimensions entered by the user, is tedious and time consuming, as the user may have to enter a large number of dimensions at each instance. The geometry of the object generated based on the dimensions entered initially may not correspond to the geometry intended by the user. Thus, the user may have to remodel the geometry by varying one or more of the dimensions, in order to generate the intended geometry of the object. Furthermore, as the user may have to utilize a large number of buttons in the menu for entering various dimensions of the object, the user may have to be an expert in using the conventional modeling tool.

The present subject matter describes generation of geometry corresponding to cross-sectional profiles of objects using a computing device. The generation of geometry of objects in accordance with the present subject matter is substantially fast, efficient, and less laborious, as the number of dimensions to be entered by a user and the manual intervention needed are much less in comparison to that for the conventional modeling tools and methodologies. Also, with the present subject matter, geometry of objects can be generated by a user not having an expertise in generating geometry of objects.

In an example implementation of the present subject matter, a sketch corresponding to the cross-sectional profile of the object is drawn on a display unit of the computing device. The sketch is drawn by a user by moving a pointer over the display unit. In an example implementation, the display unit of the computing device may be a touch screen that is sensitive and responsive to a touch of the pointer. The pointer herein may be a finger of the user or a pointing device, for example, a stylus.

As the sketch is drawn, pixel points corresponding to the sketch are generated by the display unit. The pixel points are obtained by the computing device, and low-speed pixel points, from amongst the obtained pixel points, are joined with straight lines. The low-speed pixel points are identified as pixel points at which a speed of drawing of the sketch is below a predefined threshold. The speed of drawing at a pixel point may be determined based on a distance between that pixel point and an adjacent pixel point.

After joining the low-speed pixel points with straight lines, the straight lines are processed by the computing device to generate the geometry of the object. In an example implementation, the straight lines may be processed by minimizing deviation of each of the straight lines with respect to the pixel points. Such a processing of straight lines enables in generating a basic geometry of object in which the bend angles of 0° and 90° and direction of bends are reflected with substantial accuracy. The user may then provide one or more further dimensions, such as inner and outer dimensions of object, bend radius between adjacent flanges, and the like, to the computing device to generate an intended geometry of the object.

The present subject matter provides a simple methodology of generation of the geometry of the object based on a sketch drawn by the user. With the present subject matter, the user does not have to enter the dimensions of the object in order to initiate the generation of the geometry of the object. This facilitates in reducing the time and effort of the user. Further, with the generation of the geometry of the object based on processing of straight lines as per the present subject matter, dimensions of the object, such as bend angles of 00 and 90° and direction of bends can be captured with a substantial accuracy. This facilitates in reducing the number of dimensions that are to be entered by the user for generating the intended geometry.

Further, the object for which the geometry is to be generated may be symmetrical about an axis. In an example implementation, for generating geometry of a symmetric object, a sketch corresponding to the cross-sectional profile at one side of the axis of symmetry may be drawn by the user. Based on the sketch, the low-speed points are joined by the straight lines, and the straight lines are processed to obtain a geometry corresponding to the one side of the cross-sectional profile. Subsequently, the user may define the axis of symmetry, and the computing device may accordingly generate a mirror image of the processed straight lines about the defined axis of symmetry to generate the geometry corresponding to the complete cross-sectional profile of the object. The generation of the geometry of a symmetric object based on a sketch of one half of the cross-sectional profile helps in reducing the effort of sketching the entire cross-sectional profile and also reducing the number of dimensions to be entered by the user for generating the intended geometry.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Figure 1:
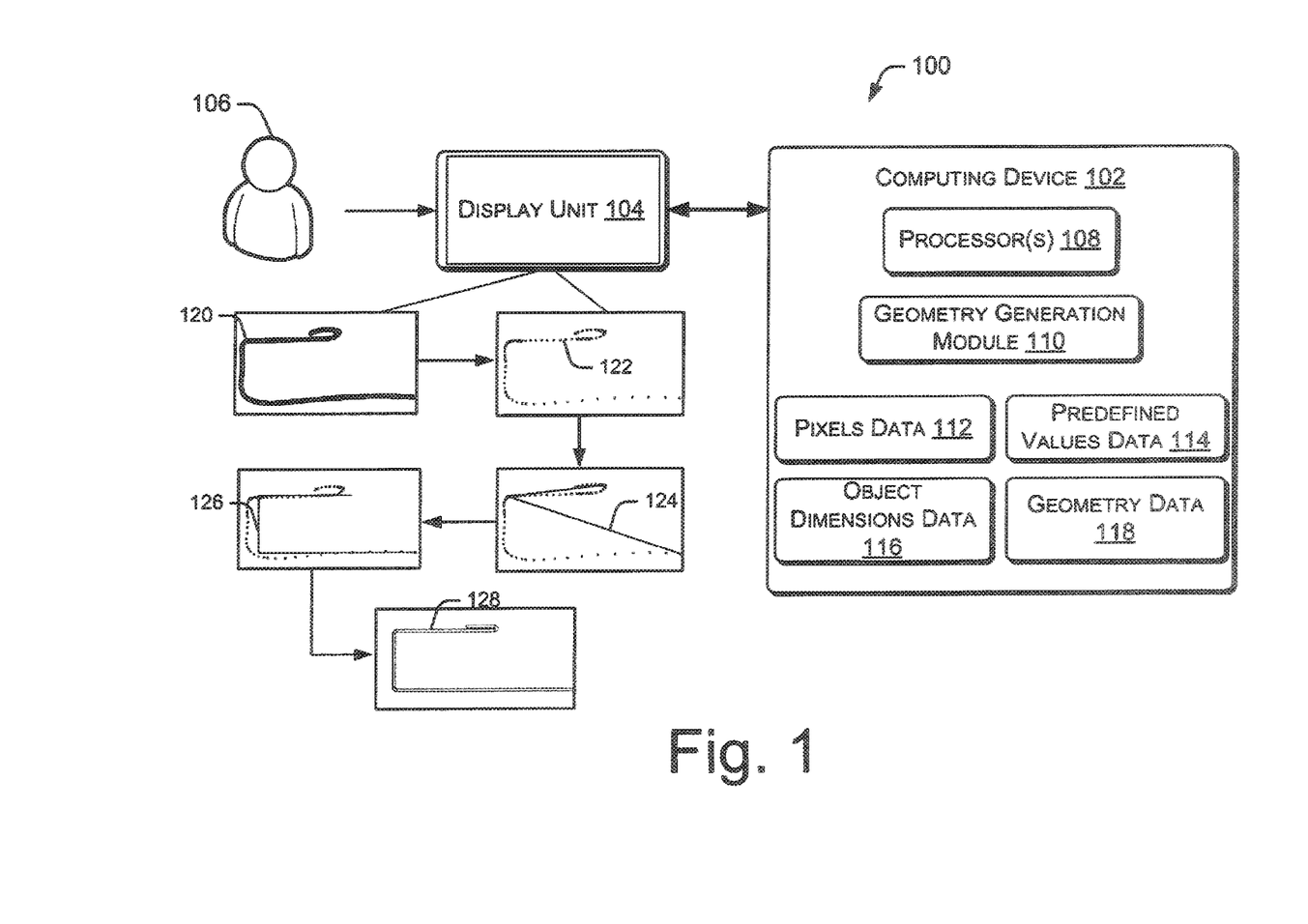
FIG. 1 illustrates a system environment including a computing device with a display unit for generating geometry of objects, according to an example implementation of the present subject matter.

FIG. 1 illustrates a system environment 100 including a computing device 102 with a display unit 104 for generating geometry of objects, according to an example implementation of the present subject matter. The computing device 102 may be a desktop computer, a laptop computer, a handheld computer, a server, and such. The display unit 104 may, for example, be a screen on which a user 106 can draw a sketch of, for example, a cross-sectional profile of an object. The display unit 104 may be integral to or coupled to the computing device 102. The display unit 104 may be coupled to the computing device 102 through a wireless link or through a communication cable.

The computing device 102 includes processor(s) 108. The processor(s) 108 may be implemented as microprocessors, microcomputers, microcontrollers, digital signal processors, central processing units, state machines, logic circuitries, and/or any devices that manipulate signals based on operational instructions. Among other capabilities, the processor(s) 108 may fetch and execute computer-readable instructions stored in a memory (not shown) coupled to the processor(s) 108 of the computing device 102. The memory may include any non-transitory computer-readable storage medium including, for example, volatile memory (e.g., RAM), and/or non-volatile memory (e.g., EPROM, flash memory, NVRAM, memristor, etc.). The memory may be internal or external to the computing device 102. The functions of the various elements shown in FIG. 1, including any functional blocks labeled as "processor(s)", may be provided through the use of dedicated hardware as well as hardware capable of executing computer-readable instructions.

As shown in FIG. 1, the computing device 102 includes a geometry generation module 110. The geometry generation module 110 is coupled to the processor(s) 108 to generate geometry of objects, in accordance with the present subject matter, based on sketches drawn by the user 106. The geometry generation module 110 may be computer-readable instructions that when executed by the processor(s) 108 perform any of the described functionalities. The computer-readable instructions may be stored on an electronic memory device, a hard disk, an optical disk or other computer-readable storage medium or non-transitory medium. In one implementation, the computer-readable instructions can also be downloaded to the storage medium via a network connection.

In another aspect of the present subject matter, the geometry generation module 110 may include routines, computer programs, objects, components, data structures, etc., which perform particular tasks or implement particular abstract data types. The geometry generation module 110 may also be implemented as signal processor(s), state machine(s), logic circuitries, and/or any other device or component that manipulate signals based on operational instructions.

Further, as shown in FIG. 1, the computing device 102 includes pixel data 112 that stores data associated with pixel points of the sketch drawn by the user 106. The computing device 102 also includes predefined values data 114 that stores data related to various predefined threshold values as per the present subject matter. The computing device 102 further includes object dimensions data 116 that stores one or more dimensions associated with the object. The computing device 102 further includes geometry data 118 that stores the data related to the geometry of the object as generated by the computing device 102. Although the data 112, 114, 116, 118 are shown internal to the computing device 102, it may be understood that the data 112, 114, 116, 118 can reside in an external memory which is coupled to the processor(s) 108 of the computing device 102.

In an implementation, the computing device 102 may also include I/O interface(s) (not shown). The I/O interface(s) may include a variety of software and hardware interfaces, for example, interfaces for peripheral device(s), such as data input/output devices, referred to as I/O devices, storage devices, network devices, etc. The I/O interface(s) may include Universal Serial Bus (USB) ports, Ethernet ports, host bus adaptors, etc., and their corresponding device drivers. The I/O interface(s) facilitate the communication of the computing device 102 with machines, such as sheet bending machines.

The description hereinafter describes, in detail, the procedure of generating a geometry corresponding to a cross-sectional profile of an object using the computing device 102. In an example, the object may be a sheet metal part with multiple flanges, and the cross-sectional profile of the object may represent a bending pattern of the sheet metal part.

In an example implementation, for the purpose of generating the geometry, the user 106 draws a sketch corresponding to the cross-sectional profile of the object on the display unit 104 of the computing device 102. The sketch may be a free-hand sketch, and the user 106 may draw the sketch by moving a pointer over the display unit 104. In an example implementation, the display unit 104 is a touch screen. The user 106 may draw the sketch on the touch screen using a finger or a stylus as the pointer. The geometry generation module 110 receives the sketch drawn by the user 106 and displays the sketch on the display unit 104. An example sketch 120 on the display unit 104 is shown in FIG. 1.

As the sketch is drawn by the user 106, the display unit 104 generates pixel points corresponding to the sketch. A pixel point refers to a location of the display unit 104 that is activated upon touch of the pointer and detected at a predetermined period of time. An example set of pixel points 122 for the sketch 120 is shown in FIG. 1. The pixel points 122 are shown for illustrative purpose, and may not be displayed on the display unit 104. The geometry generation module 110 obtains the pixel points for further processing.

After obtaining the pixel points, the geometry generation module 110 determines a speed of drawing of the sketch at each pixel point. The speed of drawing at a pixel point may be determined based on a distance between that pixel point and an adjacent pixel point, for example, a previous pixel point. After this, the geometry generation module 110 identifies pixel points at which the speed of drawing is below a predefined speed threshold. Such pixel points are referred to as low-speed pixel points. In an example, the predefined speed threshold may be a speed for a distance equal to width of 5 pixels.

After identifying the low-speed pixel points, the geometry generation module 110 joins the low-speed pixel points with straight lines. An example set of straight lines 124 joining the low-speed pixel points is shown in FIG. 1. The straight lines 124 are shown for illustrative purpose, and may not be displayed on the display unit 104. After this, the geometry generation module 110 processes the straight lines to generate the geometry of the object. In the processing of the straight lines, the geometry generation module 110 may minimize the deviation of each of the straight lines with respect to the pixel points. In an example implementation, the geometry generation module 110 may perform geometric fitting of the straight lines over the pixel points, such that deviation of each of the straight lines from the pixel points is smaller than a predefined error threshold. In an example, the predefined error threshold for a straight line may be equal to twice the thickness of the sketch associated with that straight line. An example set of processed straight lines 126 is shown in FIG. 1. The processed straight lines 126 are shown for illustrative purpose, and may not be displayed on the display unit 104. The details of the processing of the straight lines to generate the geometry of the object are described later in the description.

In an example implementation, the geometry generation module 110 may add a thickness to the processed straight lines and add bends between the processed straight lines to generate the geometry of the object. An example geometry of object 128, generated based on processing of the straight lines 126, is shown in FIG. 1. The geometry of object 128 is displayed on the display unit 104.

It may be noted that by processing the straight lines based on minimization of deviation between the straight lines and the pixel points, a basic geometry of object can be generated in which the bend angles of 0° and 90° and direction of bends are reflected in the geometry. In an example implementation, the computing device 102 allows the user 106 to provide one or more dimensions, such as inner and outer dimensions of flanges, bend angles between adjacent flanges, inner radius of bend between adjacent flanges, and a width of the object, to generate an intended geometry of the object. The geometry generation module 110 may receive such dimensions of the object from the user 106 and apply the dimensions to generate the geometry as intended by the user 106.

Further, in an example implementation, the computing device 102 allows the user 106 to define an axis of symmetry in case the object for which the geometry is to be generated has a symmetric cross-section. Depending on the object, the user 106 can define a horizontal axis of symmetry or a vertical axis of symmetry. According to the axis of symmetry defined by the user 106, the geometry generation module 110 generates a mirror image of the sketch and the processed straight lines about the axis of symmetry to generate the geometry of the object. The details of generation of a mirror image in case of a symmetric object are described through an illustrative example later in the description.

Further, after generating the geometry of the object, the geometry generation module 110 may provide an input (e.g. electric signal) corresponding to the geometry to a machine (not shown in FIG. 1). The machine may then perform work on a raw material in conformance with the geometry of the object to manufacture the object. As mentioned earlier, in an example, the object may be a sheet metal part. The geometry of the object generated by the computing device 102 represents a bending pattern of the sheet metal part. For said example, the machine to which the input is provided may be a sheet bending machine. The sheet bending machine may bend a raw material, for example, a metal sheet, in conformance with the geometry of the sheet metal part to manufacture the sheet metal part.

Figure 2A:
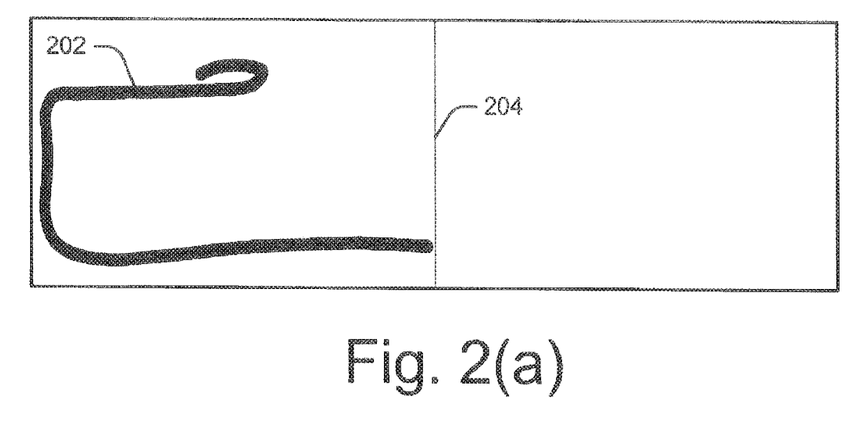
FIG. 2(a) illustrates transitioning of a sketch on the display unit of the computing device to a geometry of object, according to an example implementation of the present subject matter.
Figure 2B:
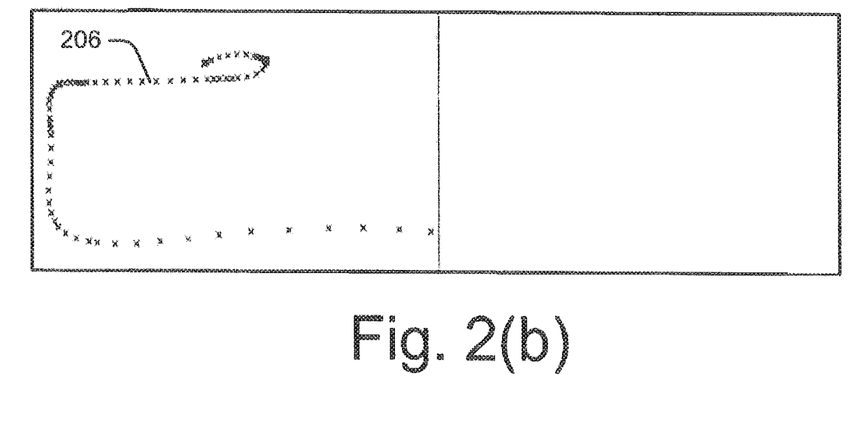
FIG. 2(b) illustrates transitioning of a sketch on the display unit of the computing device to a geometry of object, according to an example implementation of the present subject matter.
Figure 2C:
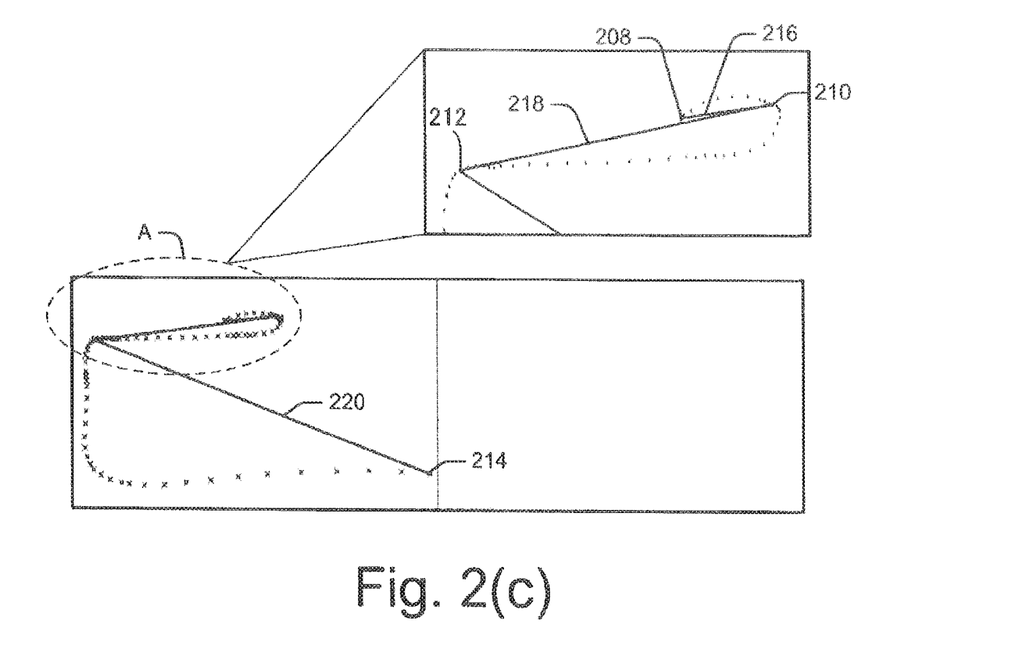
FIG. 2(c) illustrates transitioning of a sketch on the display unit of the computing device to a geometry of object, according to an example implementation of the present subject matter.

FIG. 2(a) to FIG. 2(k) illustrate transitioning of a sketch on the display unit 104 of the computing device 102 to a geometry of a sheet metal part, according to an example implementation of the present subject matter. For the example described herein, the sheet metal part is symmetric about a vertical axis of symmetry. The user 106 may define a vertical axis of symmetry and draw a sketch of one half of the sheet metal part on one of one side of the vertical axis of symmetry. FIG. 2(a) shows a sketch 202 drawn about a vertical axis of symmetry 204. The geometry generation module 110 may generate a mirror image of the sketch 202 about the axis of symmetry 204. FIG. 2(b) shows pixel points 206, as generated by the display unit 104, corresponding to the sketch 202. Each dot in FIG. 2(b) represents the position of the pixel activated by the pointer and detected at a predetermined period of time. After obtaining the pixel points 206, the geometry generation module 110 identifies the low-speed pixel points and joins the low-speed pixel points with straight lines. FIG. 2(*c*) shows four low-speed pixel points 208, 210, 212 and 214, and three straight lines 216, 218 and 220 joining the low-speed pixel points 208, 210, 212 and 214. The low-speed pixel points 208, 210 and 212, and the straight lines 216 and 218 are marked in a magnified view of dotted section A in FIG. 2(*c*). After joining of the low-speed pixel points with straight lines, the geometry generation module 110 processes the straight lines 216, 218 and 220 to generate the geometry of the sheet metal part. The processing of the straight lines 216, 218 and 220 is described with reference to FIG. 2(*d*) to FIG. 2(*h*).

Figure 2D:
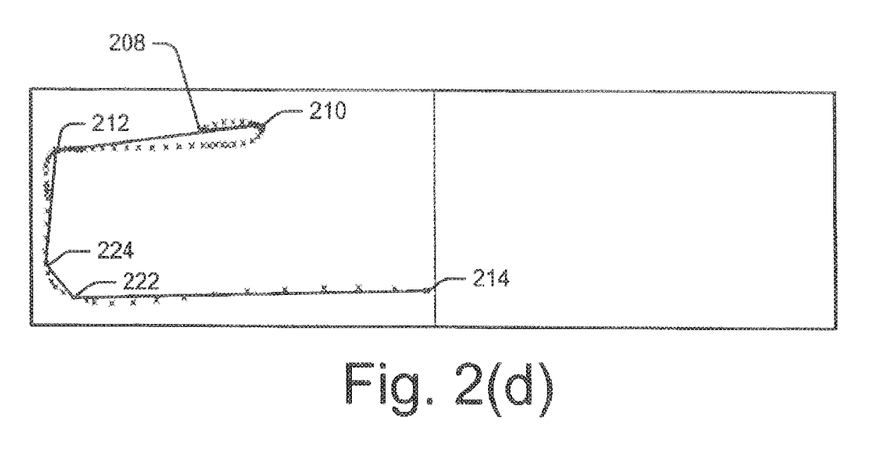
FIG. 2(d) illustrates transitioning of a sketch on the display unit of the computing device to a geometry of object, according to an example implementation of the present subject matter.

In an example, for processing the straight lines, the geometry generation module 110 may insert a vertex between two neighboring vertices of the straight lines such that deviation of the straight lines from the pixel points is smaller than a predefined error threshold. This is illustrated in FIG. 2(*d*). For the purpose of the description herein, the low-speed points 208, 210, 212 and 214 may be referred to as vertices 208, 210, 212 and 214. A vertex may be defined as a point at which two straight lines meet or a straight line terminate. As shown in FIG. 2(*d*), a vertex 222 is inserted between two initial neighboring vertices 212 and 214, such that the deviation of straight lines between the vertices 212 and 222 and between the vertices 222 and 214 from the pixel points is smaller than the predefined error threshold. Similarly, as shown in FIG. 2(*d*), a vertex 224 is inserted between two neighboring vertices 212 and 222, such that the deviation of straight lines between the vertices 212 and 224 and between the vertices 224 and 222 from the pixel points is smaller than the predefined error threshold.

Figure 2E:
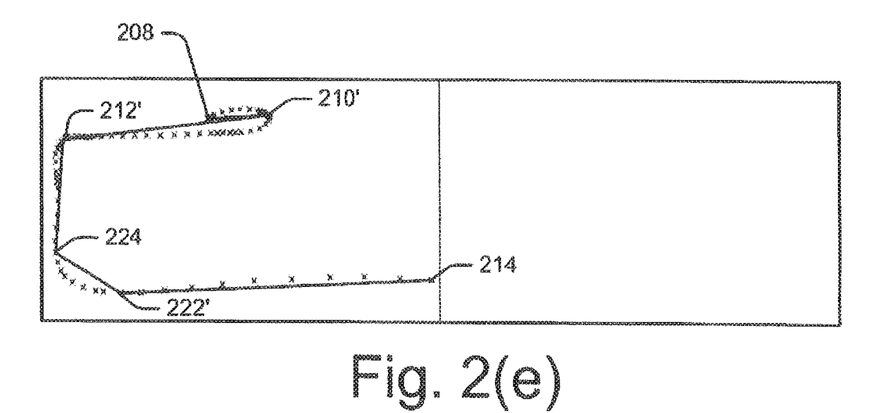
FIG. 2(e) illustrates transitioning of a sketch on the display unit of the computing device to a geometry of object, according to an example implementation of the present subject matter.

After inserting the vertices, in an example, the geometry generation module 110 may adjust each vertex of the straight lines such that the each vertex is at a maximum deviation from two vertices neighboring to the each vertex. This is illustrated in FIG. 2(*e*). As shown in FIG. 2(*e*), the vertex 210 is adjusted to a new position as a vertex 210' such that the deviation of the vertex 210' from the two vertices 208 and 212 neighboring to the vertex 210' is maximum. The vertex 212 is adjusted to a new position as a vertex 212' such that the deviation of the vertex 212' from the two vertices 210' and 224 neighboring to the vertex 212' is maximum. Also the vertex 222 is adjusted to a new position as a vertex 222' such that the deviation of the vertex 222' from the two vertices 224 and 214 neighboring to the vertex 222' is maximum. The vertices 210', 212' and 222' may be referred to as peak points.

After adjusting the vertices, in an example, the geometry generation module 110 may replace two neighboring vertices by one vertex in between the two neighboring vertices such that deviation of the straight lines from the pixel points is smaller than a predefined error threshold. The vertex that replaces the two neighboring vertices may be identified as a peak point. That is, the deviation of the identified vertex from two vertices neighboring to the identified vertex is maximum.

In an example, the geometry generation module 110 may also replace three neighboring vertices by two vertices such that deviation of the straight lines from the pixel points is smaller than a predefined error threshold. The two vertices that replace the three neighboring vertices may be identified as peak points. For three neighboring vertices Pi, Pi+1, and Pi+2, the first vertex is identified as a peak point based on Pi−1 and Pi+2, and the second vertex is identified as a peak point based on Pi and Pi+3. The concept of replacement of three neighboring vertices with two vertices can be extended in a similar manner to replace more than three vertices by one less number of vertices.

Figure 2F:
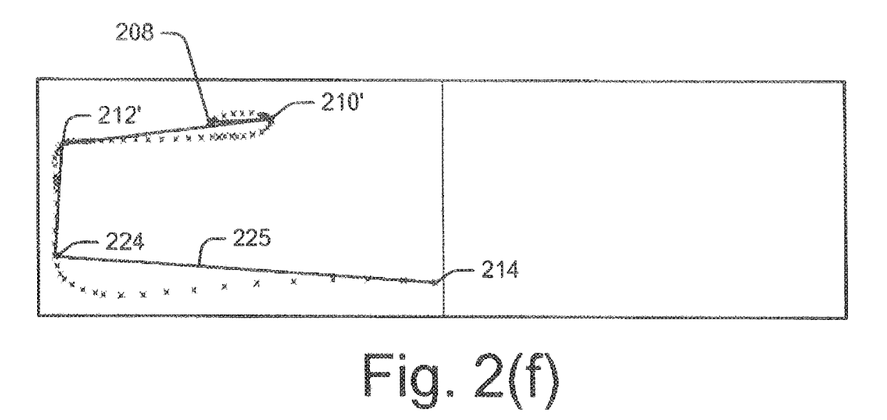
FIG. 2(f) illustrates transitioning of a sketch on the display unit of the computing device to a geometry of object, according to an example implementation of the present subject matter.

In an example, the geometry generation module 110 may also remove a vertex and check if the deviation of the straight lines from the pixel points is within a predefined error threshold. This is illustrated in FIG. 2(*f*). As shown in FIG. 2(*f*), the vertex 222' is removed and the vertices 224 and 214 are joined by a straight line 225.

Figure 2G:
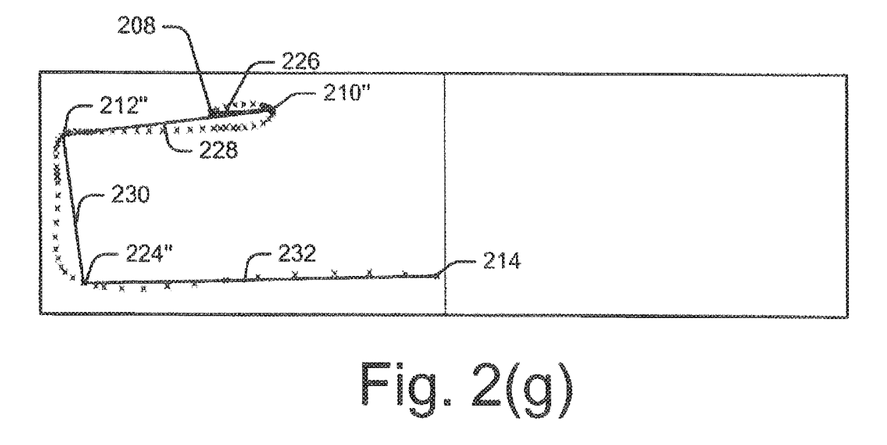
FIG. 2(g) illustrates transitioning of a sketch on the display unit of the computing device to a geometry of object, according to an example implementation of the present subject matter.

After such vertex processing which results in a reduced set of vertices, the geometry generation module 110 may adjust the vertices again such that each vertex is at a maximum deviation from its neighbors. This is illustrated in FIG. 2(*g*). As shown in FIG. 2(*g*), the vertices 210', 212' and 224 are adjusted to 210", 212" and 224", respectively. The vertices 208, 210", 212" and 224" and 214 are joined by straight lines 226, 228, 230, and 232, as shown in FIG. 2(*g*). The process of adjusting the vertices 210' 212' and 224 to the vertices 210", 212" and 224" is similar to the adjusting described earlier with respect to vertices 210, 212, and 222.

Figure 2H:
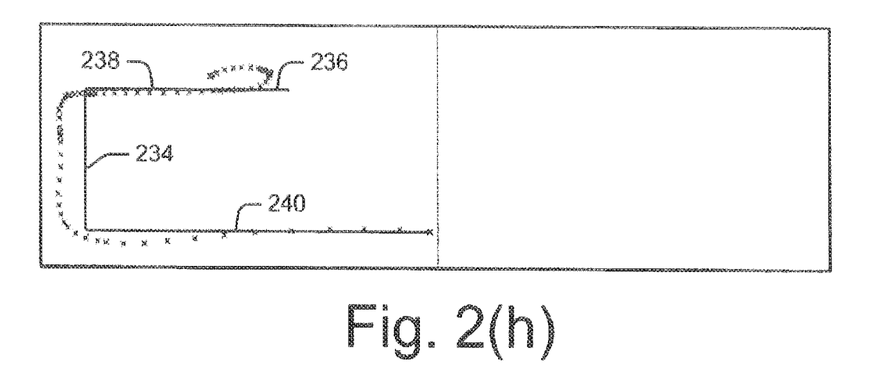
FIG. 2(h) illustrates transitioning of a sketch on the display unit of the computing device to a geometry of object, according to an example implementation of the present subject matter.

After processing the straight lines as described above, the geometry generation module 110 may orient one or more of the straight lines to horizontal lines when the one or more straight lines are inclined at an angle with respect to a horizontal axis smaller than a predefined inclined angle threshold. The geometry generation module 110 may also orient one or more of the straight lines to vertical lines when the one or more straight lines are inclined at an angle with respect to a vertical axis smaller than a predefined inclined angle threshold. The result is illustrated in FIG. 2(*h*). As shown in FIG. 2(*h*), the straight line 230 is oriented to a vertical line 234. The other three straight lines 226, 228, and 232 are oriented to horizontal lines 236, 238, and 240, respectively. It may be noted that the straight lines 236 and 238 overlap each other, but are distinct.

The predefined inclined angle threshold depends on the length of the straight line. In an example, the predefined inclined angle threshold for small lines may be 20° and the predefined inclined angle threshold for long lines may be 10°. A straight line refers to a large line when the x-component and the y-component of the straight line are more than a predefined factor times the thickness of the sketch associated with that straight line. A straight line refers to a small line when the x-component and the y-component of the straight line are less than a predefined factor times the thickness of the sketch associated with that straight line. In an example, the predefined factor may be 3.5.

In an example implementation, the straight lines may include lines that are inclined at an angle above the predefined inclined angle threshold with respect to a horizontal axis or a vertical axis. Such straight lines are retained as inclined straight lines. In an example implementation, the geometry generation module 110 may adjust one or more vertices of the straight lines such that the angles for the inclined straight lines are rounded to multiple of a predefined angle value. This predefined angle value can be 5°, 100, 15°, or more.

Figure 2I:
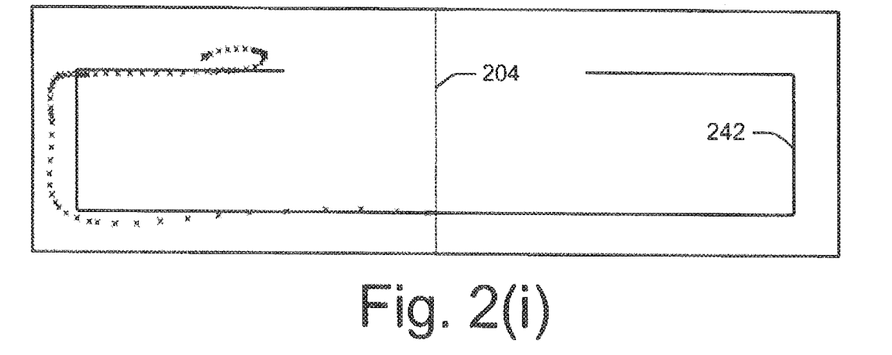
FIG. 2(i) illustrates transitioning of a sketch on the display unit of the computing device to a geometry of object, according to an example implementation of the present subject matter.

After orienting the straight lines as horizontal or vertical lines, the geometry generation module 110 generates a mirror image of the processed straight lines about the axis of symmetry 204. FIG. 2(*i*) shows the mirror image 242 of the processed straight lines about the axis of symmetry 204.

Figure 2J:
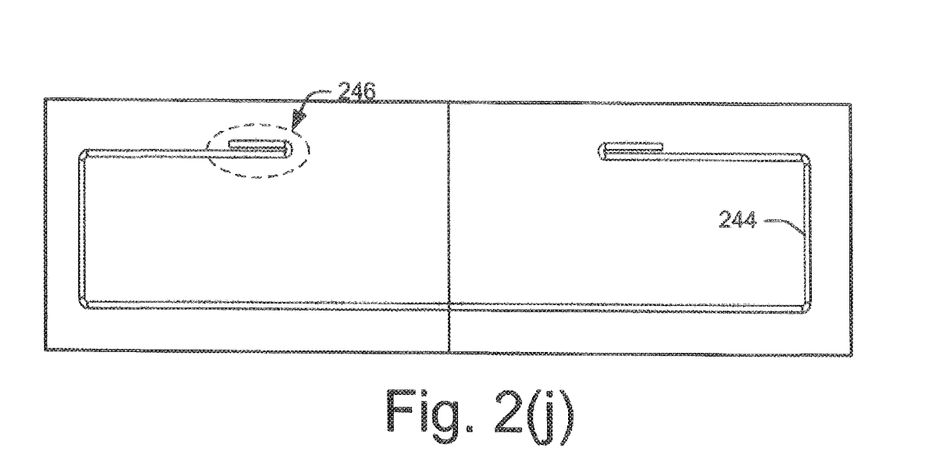
FIG. 2(j) illustrates transitioning of a sketch on the display unit of the computing device to a geometry of object, according to an example implementation of the present subject matter.

After generating the mirror image, the geometry generation module 110 adds a thickness to the straight lines and bends between the straight lines to generate the geometry that depicts flanges of the sheet metal part. The thickness may be added based on a default value of thickness. The default value may be 1.0 mm. In an example implementation, the geometry generation module 110 may receive a user input for the value of thickness. The thickness of the geometry is then set according to the user input for the thickness. FIG. 2(j) shows the geometry 244 of the sheet metal part generated by the geometry generation module 110. The geometry 244 includes a horizontal hemming 246. The detection and generation of a horizontal hemming in the geometry is described later in the description.

Figure 2K:
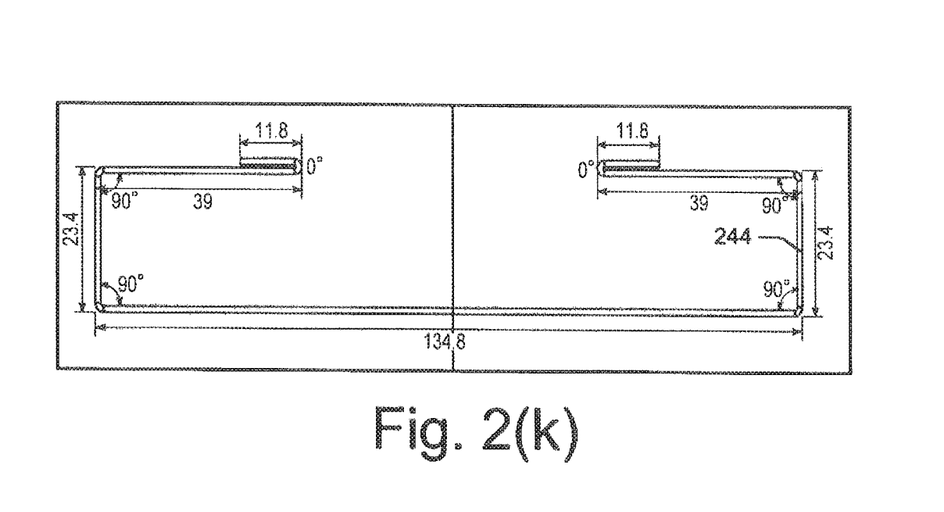
FIG. 2(k) illustrates transitioning of a sketch on the display unit of the computing device to a geometry of object, according to an example implementation of the present subject matter.

Further, FIG. 2(k) shows various dimensions of the geometry 244 as captured by the geometry generation module 110. As shown, the directing of bending between the adjacent flanges and the bend angles of 90° are captured. In addition, lengths of the flanges are also captured. The lengths may be captured based on a drawing scale that may be selected by the user 106.

It may be noted that FIG. 2(a) to FIG. 2(k) are shown to illustrate the transitioning of the sketch 202 on the display unit 104 of the computing device 102 to the geometry of object 244. The details shown through FIG. 2(b) to FIG. 2(i) may not be displayed on the display unit 104. The display unit 104 may display only the sketch 202 and the geometry of object 244.

In an example implementation, the geometry generation module 110 allows the user 106 to provide one or more dimensions to generate an intended geometry of the object. The dimensions include inner and outer dimensions of flanges, bend angles between adjacent flanges, and inner radius of bend between adjacent flanges. In an example, the geometry generation module 110 may provide a keyboard on the display unit 104 for the user 106 to enter a value of a dimension. In an example, the geometry generation module 110 may allow the user 106 to write a value of a dimension on the display unit 104 using a pointer, for example, a finger or a stylus. In another example, the geometry generation module 110 may allow the user 106 to provide a value of a dimension through a voice-based command.

In an example, the user 106 can select a flange from the geometry and provide inner and outer lengths of the flange. For this, the geometry generation module 110 provides a toggle button depicting "IN/OUT" to switch between inner length mode and the outer length mode. The user 106 may select the toggle button to switch between the inner length mode and the outer length mode for providing the inner and the outer lengths of the flange.

Further, in case two adjacent flanges have an acute angle in between, the user 106 can provide the inner and the outer lengths of the two adjacent flanges based on bend deductions in intersection OUT mode, in intersection IN mode, in tangent OUT mode, or in tangent IN mode. For this, the geometry generation module 110 provides a toggle button depicting intersection IN mode and intersection OUT mode, and a toggle button depicting tangent IN mode and tangent OUT mode. The user 106 may select the toggle buttons to switch between any one of the modes for providing the inner and the outer lengths of the two adjacent flanges having an acute angle in between. It may be noted that in the intersection OUT mode, the lengths of the two adjacent flanges may be provided based on intersection of the outer lines of the two adjacent flanges. In the intersection IN mode, the lengths of the two adjacent flanges may be provided based on intersection of the inner lines of the two adjacent flanges. Further, in the tangent OUT mode, the lengths of the two adjacent flanges may be provided based on the tangents from the outside of the bend between the two adjacent flanges. In the tangent IN mode, the lengths of the two adjacent flanges may be provided based on the tangents from the inside of the bend between the two adjacent flanges.

In an example implementation, the dimension provided by the user 106 may also include a width of the sheet metal part. With the width of the sheet metal part, the geometry generation module 110 may generate a 3-dimensional (3D) model of the sheet metal part. The 3D model may be generated by sweeping the geometry, generated by the computing device, along the width. The 3D model may provide a visual guidance to a user and help in selecting tools for bending a metal sheet while manufacturing the sheet metal part.

It may be noted that, with the processing of the straight lines as described above, the geometry generation module 110 is able to detect a horizontal hemming and a vertical hemming while generating the geometry of the object. A horizontal hemming can be detected when two adjacent straight lines about a common vertex are inclined at an angle smaller than the predefined inclined angle threshold with respect to a horizontal axis. In this case, the geometry generation module 110 orients the adjacent two straight lines to horizontal lines that overlap each other about the common vertex. Similarly, a vertical hemming can be detected when two adjacent straight lines about a common vertex are inclined at an angle smaller than the predefined inclined angle threshold with respect to a vertical axis. In this case, the geometry generation module 110 orients the two adjacent straight lines to vertical lines that overlap each other about the common vertex. An example of a horizontal hemming is illustrated in FIG. 2(g) and FIG. 2(h), where the adjacent straight lines 226 and 228 are inclined at an angle smaller than the predefined inclined angle threshold with respect to the horizontal axis. As a result a horizontal hemming is detected and the straight lines 236 and 238 are overlapped about a common vertex. The thickness to the straight lines 236 and 238 and bends between the straight lines 236 and 238 are added to generate the horizontal hemming 246 as shown in FIG. 2(j).

In an example implementation, the geometry generation module 110 can also detect an inclined hemming. The inclined hemming is detected when two adjacent straight lines about a common vertex are inclined at an angle more than the predefined inclined angle threshold, and when an angle between the two adjacent straight lines is smaller than a predefined hemming angle threshold. In this case, the geometry generation module 110 overlaps the two adjacent straight lines about the common vertex to represent the inclined hemming.

Figure 3:
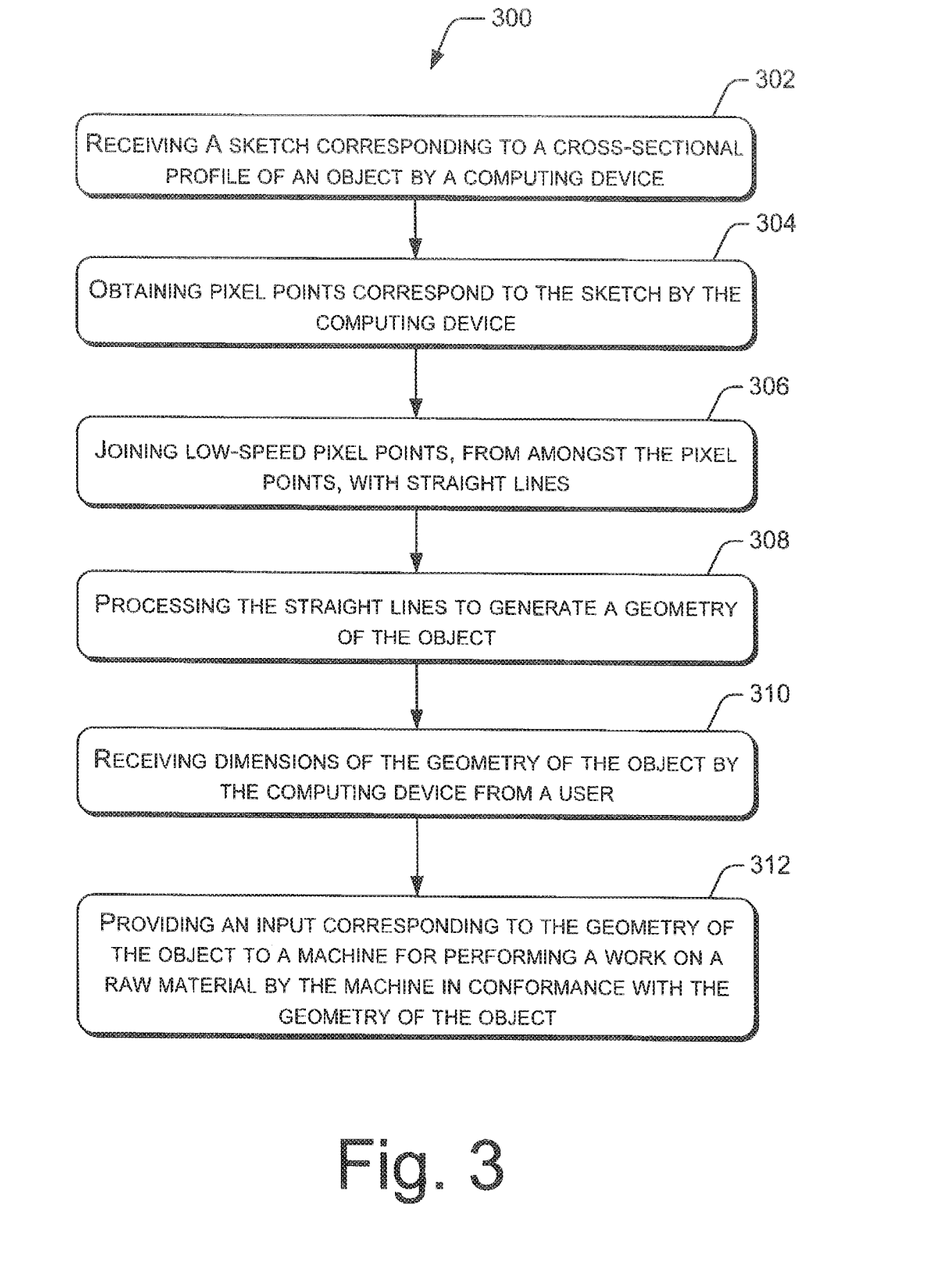
FIG. 3 illustrates a method of generating a geometry of an object, according to an example implementation of the present subject matter.

FIG. 3 illustrates a method 300 of generating a geometry of an object, according to an example implementation of the present subject matter. The order in which the method 300 is described is not intended to be construed as a limitation, and any number of the described method blocks can be combined in any order to implement the method 300. Furthermore, the method 300 can be implemented by processor(s) or computing device(s) through any suitable hardware, non-transitory computer-readable instructions, or combination thereof. Further, although the method 300 is described in context of the aforementioned computing device 102, other suitable computing devices or systems may be used for execution of at least one step of method 300. It may be understood that steps of method 300 can be executed based on instructions stored in a non-transitory computer-readable medium, as will be readily understood. The non-transitory computer-readable medium may include, for example, digital memories, magnetic storage media, such as a magnetic disks and magnetic tapes, hard drives, or optically readable digital data storage media.

Referring to FIG. 3, at block 302, a sketch corresponding to a cross-sectional profile of an object is received by the computing device 102. The sketch is drawn by a user 106 by moving a pointer over a display unit 104 of the computing device 102. At block 304, pixel points correspond to the sketch are obtained by the computing device 102 by detecting an activated pixel at a predetermined period of time. The pixel points corresponding to the sketch are generated by the display unit 104 of the computing device 102.

After obtaining the pixel points, low-speed pixel points, from amongst the pixel points, are joined with straight lines, at block 306. As mentioned earlier, the low-speed pixel points refer to the pixel points at which a speed of drawing of the sketch is below a predefined speed threshold. After this, at block 308, the straight lines are processed by the computing device 102 to generate the geometry of the object. As mentioned earlier, the straight lines are processed based on minimization of deviation of each of the straight lines with respect to the pixel points.

For the processing of the straight lines, a vertex is inserted between two neighboring vertices of the straight lines such that deviation of the straight lines from the pixel points is smaller than a predefined error threshold. Further, each vertex of the straight lines is adjusted such that the each vertex is at a maximum deviation from two vertices neighboring to the each vertex. Further, two neighboring vertices may be replaced by one vertex in between the two neighboring vertices such that deviation of the straight lines from the pixel points is smaller than a predefined error threshold. Further, three neighboring vertices may be replaced by two vertices such that deviation of the straight lines from the pixel points is smaller than a predefined error threshold. After such vertex processing, the vertices may be adjusted again such that each vertex is at a maximum deviation from its neighbors. Further, one or more of the straight lines are oriented to horizontal lines when the one or more straight lines are inclined at an angle with respect to a horizontal axis smaller than a predefined inclined angle threshold. Similarly, one or more of the straight lines are oriented to vertical lines when the one or more straight lines are inclined at an angle with respect to a vertical axis smaller than a predefined inclined angle threshold. Further, two adjacent straight lines, from the straight lines, are overlapped to represent an inclined hemming, when an angle between the two adjacent straight lines is smaller than a predefined hemming angle threshold. Further, in case the object is a symmetric object, an axis of symmetry may be defined by the user 106, and a mirror image of the processed straight lines is generated about an axis of symmetry.

At block 310, dimensions of the geometry of the object are received by the computing device 102 from the user 106. In an example implementation, the dimensions of the geometry of the object include one or more of inner dimensions of flanges, outer dimensions of flanges, bend angles between adjacent flanges, an inner radius of bend between adjacent flanges, and a width of the object.

Further, at block 312, an input (e.g. an electric signal) corresponding to the geometry of the object is provided to a machine, by the computing device 102, for performing a work on a raw material by the machine in conformance with the geometry of the object. In an example implementation, the machine is a sheet bending machine.

Although implementations for generating a geometry corresponding to a cross-sectional profile of an object have been described in language specific to structural features and/or methods, it is to be understood that the present subject matter is not necessarily limited to the specific features or methods described. Rather, the specific features and methods are disclosed and explained as example implementations for generating a geometry corresponding to a cross-sectional profile of an object.

The invention claimed is:

1. A method for generating a geometry corresponding to a cross-sectional profile of an object, the method comprising:
   receiving a sketch, by a computing device having a processor, corresponding to the cross-sectional profile of the object, wherein the sketch is drawn by moving a pointer device over a display of the computing device;
   obtaining, by the computing device, pixel points generated by the display, wherein the pixel points correspond to the sketch;
   joining, by the computing device, low-speed pixel points, from amongst the pixel points, with straight lines, wherein the low-speed pixel points are pixel points at which a speed of drawing of the sketch is below a predefined speed threshold;
   processing, by the computing device, the straight lines into the geometry of the object;
   providing to a machine, by the computing device, an input corresponding to the geometry of the object; and
   generating, by the computing device, a mirror image of the processed straight lines about an axis of symmetry, wherein the axis of symmetry is user defined.

2. A method for generating a geometry corresponding to a cross-sectional profile of an object, the method comprising:
   receiving a sketch, by a computing device having a processor, corresponding to the cross-sectional profile of the object, wherein the sketch is drawn by moving a pointer device over a display of the computing device;
   obtaining, by the computing device, pixel points generated by the display, wherein the pixel points correspond to the sketch;
   joining, by the computing device, low-speed pixel points, from amongst the pixel points, with straight lines, wherein the low-speed pixel points are pixel points at which a speed of drawing of the sketch is below a predefined speed threshold;
   processing, by the computing device, the straight lines into the geometry of the object and
   providing to a machine, by the computing device, an input corresponding to the geometry of the object,
   wherein the processing of the straight lines comprises:
      orienting one or more of the straight lines to horizontal lines when the one or more straight lines are inclined at an angle with respect to a horizontal axis smaller than a predefined inclined angle threshold; and
      orienting one or more of the straight lines to vertical lines when the one or more straight lines are inclined at an angle with respect to a vertical axis smaller than a predefined inclined angle threshold.

3. A method for generating a geometry corresponding to a cross-sectional profile of an object, the method comprising:
   receiving a sketch, by a computing device having a processor, corresponding to the cross-sectional profile of the object, wherein the sketch is drawn by moving a pointer device over a display of the computing device;
   obtaining, by the computing device, pixel points generated by the display, wherein the pixel points correspond to the sketch;

joining, by the computing device, low-speed pixel points, from amongst the pixel points, with straight lines, wherein the low-speed pixel points are pixel points at which a speed of drawing of the sketch is below a predefined speed threshold;

processing, by the computing device, the straight lines into the geometry of the object and providing to a machine, by the computing device, an input corresponding to the geometry of the object, wherein the processing of the straight lines comprises overlapping two adjacent straight lines, from the straight lines, to represent an inclined hemming, when an angle between the two adjacent straight lines is smaller than a predefined hemming angle threshold.

4. A non-transitory computer-readable medium storing a computer program for causing a computing device having a processor to perform:

receiving, via the computing device, a sketch corresponding to the cross-sectional profile of the object, wherein the sketch is drawn by moving a pointer device over a display of the computing device;

obtaining, via the computing device, pixel points generated by the display, wherein the pixel points correspond to the sketch;

joining, via the computing device, low-speed pixel points, from amongst the pixel points, with straight lines, wherein the low-speed pixel points are pixel points at which a speed of drawing of the sketch is below a predefined speed threshold;

processing, via the computing device, the straight lines into the geometry of the object; and providing, to a machine via the computing device, an input corresponding to the geometry of the object, wherein the computer program is causing the computing device to further perform generating a mirror image of the processed straight lines about an axis of symmetry, wherein the axis of symmetry is user defined.

5. A non-transitory computer-readable medium storing a computer program for causing a computing device having a processor to perform:

receiving, via the computing device, a sketch corresponding to the cross-sectional profile of the object, wherein the sketch is drawn by moving a pointer device over a display of the computing device;

obtaining, via the computing device, pixel points generated by the display, wherein the pixel points correspond to the sketch;

joining, via the computing device, low-speed pixel points, from amongst the pixel points, with straight lines, wherein the low-speed pixel points are pixel points at which a speed of drawing of the sketch is below a predefined speed threshold;

processing, via the computing device, the straight lines into the geometry of the object and providing, to a machine via the computing device, an input corresponding to the geometry of the object, wherein the processing of the straight lines comprises:

orienting one or more of the straight lines to horizontal lines when the one or more straight lines are inclined at an angle with respect to a horizontal axis smaller than a predefined inclined angle threshold; and orienting one or more of the straight lines to vertical lines when the one or more straight lines are inclined at an angle with respect to a vertical axis smaller than a predefined inclined angle threshold.

6. A method for generating a geometry corresponding to a cross-sectional profile of an object, the method comprising:

receiving a sketch, by a computing device having a processor, corresponding to the cross-sectional profile of the object, wherein the sketch is drawn by moving a pointer device over a display of the computing device;

obtaining, by the computing device, pixel points generated by the display, wherein the pixel points correspond to the sketch;

joining, by a computing device, low-speed pixel points, from amongst the pixel points, with straight lines, wherein the low-speed pixel points are pixel points at which a speed of drawing of the sketch is below a predefined speed threshold;

processing, by the computing device, the straight lines into the geometry of the object; and providing to a machine, by the computing device, an input corresponding to the geometry of the object, wherein speed of drawing at a pixel point is determined based on a distance between the pixel point and an adjacent pixel point.

7. A non-transitory computer-readable medium storing a computer program for causing a computing device having a processor to perform:

receiving, via the computing device, a sketch corresponding to the cross-sectional profile of the object, wherein the sketch is drawn by moving a pointer device over a display of the computing device;

obtaining, via the computing device, pixel points generated by the display, wherein the pixel points correspond to the sketch;

joining, via the computing device, low-speed pixel points, from amongst the pixel points, with straight lines, wherein the low-speed pixel points are pixel points at which a speed of drawing of the sketch is below a predefined speed threshold;

processing, via the computing device, the straight lines into the geometry of the object; and providing to a machine, via the computing device, an input corresponding to the geometry of the object, wherein speed of drawing at a pixel point is determined based on a distance between the pixel point and an adjacent pixel point.

* * * * *